(12) United States Patent
Meckenstock et al.

(10) Patent No.: US 11,731,498 B2
(45) Date of Patent: Aug. 22, 2023

(54) BATTERY TRAY FOR PROTECTING THE VEHICLE BATTERY OF A HYBRID MOTOR

(71) Applicant: Ford Global Technologies, LLC, Dearborn, MI (US)

(72) Inventors: Daniel Meckenstock, Wuppertal (DE); Marius Sawatzki, Pulheim (DE); Frank Michel, Odenthal (DE); Tachafine Machaar, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 17/077,908

(22) Filed: Oct. 22, 2020

(65) Prior Publication Data

US 2021/0122222 A1 Apr. 29, 2021

(30) Foreign Application Priority Data

Oct. 27, 2019 (DE) .......................... 102019128940.8

(51) Int. Cl.
*B60K 1/04* (2019.01)
*B62D 25/20* (2006.01)
*H01M 50/20* (2021.01)

(52) U.S. Cl.
CPC ............ *B60K 1/04* (2013.01); *B62D 25/2036* (2013.01); *H01M 50/20* (2021.01);
(Continued)

(58) Field of Classification Search
CPC .............. B60K 1/04; B60K 2001/0438; B60K 2001/0427; H01M 50/20; H01M 2220/20; B60Y 2306/01
See application file for complete search history.

(56) References Cited

U.S. PATENT DOCUMENTS 4,216,839 A 4/1980 Gould et al.
6,811,197 B1 * 11/2004 Grabowski ............... B60R 7/04
180/68.5
(Continued)

FOREIGN PATENT DOCUMENTS

DE 19839519 3/2000
DE 60008205 7/2004
(Continued)

OTHER PUBLICATIONS

Abele, Rudiger, The impact of electro-mobility on vehicle body construction, Altair Inspire Cast, Streamlined Casting Simulation, Mercedes-Benz, Nov. 18, 2017, retrieved from http://www.autocarpro.in/feature/impactelectromobilityvehiclebodyconstruction27147.

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

An assembly provides impact protection for a vehicle battery of a hybrid motor vehicle, in particular a mild hybrid motor vehicle. The hybrid motor vehicle can have at least a first vehicle seat, a second vehicle seat arranged adjacent to the first vehicle seat, a center console arranged therebetween, and a center tunnel arranged below the center console and a vehicle battery. The assembly can include a battery tray having an upwardly directed opening for receiving the vehicle battery which is arranged, or can be arranged, in the region of the center console between the first vehicle seat and the second vehicle seat.

18 Claims, 3 Drawing Sheets

(52) U.S. Cl.
CPC .............. *B60K 2001/0427* (2013.01); *B60K 2001/0438* (2013.01); *B60Y 2306/01* (2013.01); *H01M 2220/20* (2013.01)

(56) References Cited

U.S. PATENT DOCUMENTS

| | | | |
|---|---|---|---|
| 7,540,343 B2 | 6/2009 | Nakashima et al. | |
| 8,376,074 B2* | 2/2013 | Yoda | B60L 3/0007 180/68.5 |
| 10,399,425 B2* | 9/2019 | Okamura | B62D 21/02 |
| 2012/0251863 A1* | 10/2012 | Berger | H01M 50/116 429/99 |
| 2017/0029034 A1* | 2/2017 | Faruque | H01M 50/20 |

FOREIGN PATENT DOCUMENTS

| | | |
|---|---|---|
| DE | 102008051786 | 4/2009 |
| DE | 102009006990 | 8/2010 |
| DE | 102010045997 | 11/2011 |
| DE | 102011122527 | 6/2013 |
| EP | 3360759 | 8/2018 |
| JP | 2015085828 | 5/2015 |
| WO | 2013053433 | 4/2013 |

* cited by examiner

BATTERY TRAY FOR PROTECTING THE VEHICLE BATTERY OF A HYBRID MOTOR

CROSS-REFERENCE TO RELATED APPLICATIONS

This application claims priority to DE Patent Application No. 102019128940.8, which was filed on 27 Oct. 2019 and is incorporated herein by reference in its entirety.

TECHNICAL FIELD

This disclosure relates to an assembly that provides protection for a vehicle battery of a hybrid motor vehicle, such as a mild hybrid motor vehicle.

BACKGROUND

A widespread variant of a hybrid motor vehicle is the so-called mild hybrid (mHEV). Although an electric motor is used in mild hybrid vehicles, its torque and battery power are typically not sufficient in themselves to drive the motor vehicle. The electric drive only supports the internal combustion engine in order to increase power. Nevertheless, the mild hybrid has good fuel efficiency potential and can be additionally integrated into existing vehicle designs at little cost. The vehicle battery for mild hybrids of this kind is typically a 48-Volt battery.

The amount of storage space available for the 48-Volt battery in a hybrid motor vehicle is limited. A possible location for the arrangement of the 48-Volt battery is, for example, proposed in "The Impact of Electro-Mobility on Vehicle Body Construction" (from autocarpro.in) in the region of the center console of a vehicle, since this is where the battery is would potentially be furthest away from the outer wall of the vehicle in the event of an impact. The amount of storage space available in the region of the center console is, however, limited which means that it has to be completely used and the size of the battery typically takes up the entire width of the center console. There is then only very little space left for a crumple zone designed to offer protection in the event of a lateral impact involving the hybrid motor vehicle.

Motor vehicles can include deformation zones or crumple zones to absorb loads. Some crumple zones protect the vehicle electronics and, in the case of a hybrid vehicle, the vehicle battery.

A pole impact test of a motor vehicle can involve a side impact being simulated in which the vehicle is catapulted against rigid objects such as trees or poles. In an impact of this kind, on the driver's side of the vehicle the driver's seat can be pressed against the center console in the transverse vehicle direction (y-axis/y-direction) with respect to the center of the vehicle. This presses the center console against the passenger's seat, as a result of which the center console may be loaded. The main load path within the seats during this process can be the seat axis on which the seat back is rotated or pivoted back and forth. This rotational axis of the seat back can be formed by a crossbar or cross member made of metal which extends from the left to the right over the entire width of each vehicle seat.

In the event of a lateral vehicle impact, the center console, which contains the vehicle battery, could be compressed between two crossbars of the rotational axes of the seat backs of the two vehicle seats in a small area. The load peaks in this region may be around 10 kN.

Since vehicle seats can be movable along the longitudinal vehicle axis (x-axis/x-direction) and along the vertical vehicle axis (z-axis/z-direction) for adjustment to different vehicle passengers, the region of the outside of the vehicle battery affected by a loading of this kind by the seat back cross member can extend over the entire x/z plane.

The prior art proposes various solutions aimed at addressing impact loads being directed toward the vehicle.

U.S. Pat. No. 8,376,074 B2 protects an arrangement with a battery which is fixed on a floor element between two vehicle seats. A reinforcement element is provided for fixing the first seat and the second seat. In this case, the reinforcing element is configured in such a manner that it extends over the battery in a U-shaped manner, so that the reinforcing element creates a bridge between the first seat and the second seat.

The battery arrangement in US 2017/029034 A1 includes a floor tray with a carrier that receives a traction battery and is itself fastened to the vehicle sill. In respect of the longitudinal direction of the vehicle, two guide rails are provided at the front and rear in which the carrier is displaceably mounted. If the sill breaks as a result of an impact load, the carrier slides with the traction battery in the transverse vehicle direction away from the place of impact.

DE 10 2010 045 997 A1 discloses an assembly in which a vehicle battery is arranged in trapezoidal form, in other words with lateral bevels, in the center tunnel of the center console of the vehicle. A likewise beveled reinforcement is provided on the upper side of the vehicle battery, as a result of which the vehicle battery along with the reinforcement is adapted to the geometry in the center tunnel. Supported in this manner from within, in the event of a lateral impact, the center console forms a support or an abutment against a crossbar of the vehicle seat which has a predetermined breaking point. The predetermined breaking point causes the crossbar to bend upwardly and raises or pushes the seat frame of the vehicle seat over the center console.

DE 10 2011 122 527 A1 discloses a structure for protecting a battery in the center tunnel of the center console of a vehicle. In this case, at least one side wall of the center tunnel is reinforced in the region of the vehicle seat by means of an impact energy-absorbing plate which absorbs lateral forces occurring on the vehicle seat in the event of a side impact.

In U.S. Pat. No. 7,540,343 B2, a fuel cell stack is arranged in the center tunnel of the center console. The region of the center tunnel which surrounds the stack has a reinforced design, such that in the event of a lateral impact, the load is transferred from one vehicle seat directly to the other vehicle seat and the load on the stack lying therebetween is minimized.

JP 2015-85828 A discloses an assembly in a hybrid vehicle in which a vehicle battery is arranged in a housing elevated on the center tunnel. The housing can be divided into a first portion and a second portion. The first portion is arranged between the two front seats. The first portion is deformably arranged relative to the second portion for the absorption of impact energy, so that in the event of a lateral impact on the vehicle, the battery remains protected in the housing.

Although rigid boxes or reinforcements can protect the vehicle battery from direct mechanical action, they can reduce the effectiveness of the deformation zone.

SUMMARY

The teachings of this disclosure relate to protecting the vehicle battery of a hybrid motor vehicle and optimizing the deformation zone of the motor vehicle, particularly in the event of a lateral impact.

According to the disclosure, an assembly of a hybrid motor vehicle, in particular a mild hybrid motor vehicle, can include a vehicle battery and a vehicle seat. The vehicle battery is arranged, or can be arranged, in the region of the center console.

It should be pointed out that the features and measures specified individually in the following description can be combined with one another in any technically feasible manner and disclose further embodiments of the disclosure. The description characterizes and specifies exemplary embodiments of this disclosure, particularly in conjunction with the figures in addition. The terms "above" and "below" or "on the upper side" and "on the lower side" should be understood in relation to an operating position of the vehicle, i.e. "upwards" points in the direction of the vehicle top and "downwards" points in the direction of the substructure or vehicle floor. The term "vehicle battery" includes the battery itself, but also, where appropriate, the housing or battery cage or protective cage belonging to the battery. Exemplary embodiments of this disclosure relate to the front seats in the vehicle, but the vehicle battery may also be arranged between each other row of seats in the vehicle.

The disclosure generally relates to an assembly providing impact protection for a vehicle battery of a hybrid motor vehicle, in particular a mild hybrid motor vehicle. An assembly of this kind is for a hybrid motor vehicle. The assembly can include at least a first vehicle seat, a second vehicle seat arranged adjacent to the first vehicle seat, a center console arranged therebetween, a center tunnel arranged below the center console and a vehicle battery. The assembly according to exemplary aspects of the disclosure has a battery tray for receiving the vehicle battery. The battery tray has an opening on the upper side or an upwardly directed opening, and is arranged, or can be arranged, in the region of the center console between the first vehicle seat and the second vehicle seat.

By means of the disclosure, an environment is created for the battery that can protect the battery and provide freedom of movement. The battery tray acts as a kind of protective tray, providing the assembly with the stiffness required in order to protect the vehicle battery from unacceptable loads or deformation caused by, for example, an up to 10 kN load through contact with rigid components of the adjacent vehicle seat. In other words, the first vehicle seat and the second vehicle seat preferably form the front row of seats with the driver's seat and the passenger's seat which is arranged in the transverse vehicle direction. A vehicle battery is arranged between the vehicle seats in the region of the center console. A battery tray can provide impact protection for the vehicle battery, particularly in the event of a lateral impact, in the inside of which battery tray the vehicle battery is arranged. The battery tray surrounds the vehicle battery downwardly and to the sides. In this way, it acts as a protective cage on all sides, like a virtual "second skin" in the event of a side impact.

Any gaps between the battery tray and the vehicle battery can be additionally filled with a damping or protective material where appropriate. By means of the upwardly directed opening, the vehicle battery can be placed in the battery tray during installation and removed again during installation and maintenance work. The geometry of the battery tray is of course adapted to different sizes or geometries of vehicle batteries used. Despite the small amount of space available, damage to the vehicle battery during a lateral impact can be reduced by the battery tray.

In an exemplary embodiment, the assembly has a flexible fastening device. The battery tray can be fastened, or is fastened, to the hybrid motor vehicle by means of the flexible fastening device movably relative to the center tunnel.

The flexibility of the fastening device facilitates a movement relative to the center tunnel and/or to the center console and/or to the adjacent vehicle seats. Through relative movements of this kind, elastic compensating movements are firstly possible while travelling, in order to compensate for vibrations. In addition, the impact energy during a lateral impact of the hybrid motor vehicle can be absorbed and therefore reduced through a movement of the battery tray in the transverse vehicle direction with the help of the flexible fastening device.

The battery tray can be arranged above the center tunnel in relation to the vehicle vertical axis. If a vehicle seat is displaced towards the center of the vehicle, and therefore to the center console, during a lateral impact, the battery tray does not remain fixed but is moved along with the displaced vehicle seat. The vehicle seat and the battery tray are telescoped, so to speak, and thereby dissipate the impact energy. The fastening device allows this movement thanks to its flexibility, but at the same time prevents a detachment, which can be undesirable.

In an embodiment of the disclosure, the fastening device of the assembly comprises one or multiple connecting elements which are configured to fasten an underside of the battery tray to a center tunnel upper side of the center tunnel.

The battery tray can therefore also be supported by the connecting elements of the fastening device. The battery tray therefore stands on an upper side of the center tunnel virtually with the help of its connecting elements. This allows particularly easy installation of the assembly, in particular of the battery tray, in the hybrid motor vehicle.

In addition, in order to improve stability, the battery tray of the assembly may be provided with a stiffening cover for closing the upwardly directed opening of the battery tray. This cover preferably lies on the opening edge of the upwardly directed opening of the battery tray and can be removed from the battery tray with no, or with only a small amount of, force. The two-part embodiment of the battery tray allows a more selective distribution of load and improved stability. In this way, while the stability remains the same, material savings can be made and the weight of the assembly can thereby be reduced.

The assembly is particularly suitable of a hybrid motor vehicle, preferably for a mild hybrid vehicle, in which the first vehicle seat and/or the second vehicle seat has/have at least one crossbar or another cross member which are oriented in the transverse vehicle direction. A crossbar of this kind is, for example, the rotational axis of the seat back of the vehicle seat. In an optional development, the assembly therefore has a load distribution device which is arranged, or can be arranged, between the crossbar and the battery tray.

A lateral impact to the hybrid motor vehicle can, in some examples, lead to a point load on the vehicle battery or the battery tray, particularly due to the crossbar of the rotational axis of the seat back which extends over the entire width of the vehicle seat. In order to improve reduce loading on the vehicle battery, embodiments of the present disclosure distribute this point load over a large area with the help of the load distribution device. The loading of the battery tray therefore takes place over a large area rather than at points, which means that load peaks of 10 kN, for example, can be reduced to 5-6 kN.

The load distribution device can include a cover arranged at an end, or end portion, of the crossbar facing the center console, which cover may form an abutment surface. The abutment surface can be oriented perpendicularly to the crossbar.

The abutment surface provided by this cover therefore lies in an x-z plane, so a plane which is oriented parallel to the vehicle longitudinal axis and to the vehicle vertical axis. In the event of a lateral impact, the crossbar is moved in the transverse vehicle direction towards the center console, for example. By arranging the cover between the crossbar and the center console, a direct contact or abutment between the crossbar and center console or battery tray is avoided. Instead, the force of the impact is distributed in a planar manner, which can reduce a load directed into the battery tray. In principle, the original cover of the crossbar can be reused for the rotational axis of the seat back, which reduces the cost of changing over to a hybrid motor vehicle with an assembly of this kind. Alternatively, a cover specially adapted to this load scenario can also be designed, for example with a rib structure for improving the stability or load distribution.

In an advantageous development of the disclosure, the load distribution device may have a plate, wherein the plate is suitable for transmitting a load or force from the crossbar to the cover and/or battery tray.

This additional plate is preferably arranged between the crossbar and the cover. The function of the plate in the event of the hybrid motor vehicle suffering a lateral impact is that of damping the momentum or the load of the movement of the crossbar and simultaneously distributing it over a larger area. This can be achieved by force-fitting and/or form-fitting connections both towards the crossbar and also the cover. The plate can act as a bypass during distribution of the load from the crossbar to the cover and/or the battery tray. The distribution of load over a large area takes place in two stages; initially from the crossbar to the plate and then from the plate to the protective cover. Alternatively, the cover and plate can also be produced in one piece and/or using shock-absorbing materials.

In addition, the cover and/or the plate may have a rib structure for reinforcing said cover and/or plate. Rib structures are suitable in principle for improving the stiffness and therefore the stability of a component. In particular, the plate can be optimally configured for the load case during a lateral impact on the hybrid motor vehicle, irrespective of design specifications, as a butt plate which may not be visible from outside when an additional cover is used.

A hybrid motor vehicle can include one of the assemblies in one of the previously described embodiments.

To avoid unnecessary duplication of effort and repetition of text in the specification, certain features are described in relation to only one or several aspects or embodiments. However, it is to be understood that, where it is technically possible, features described in relation to any aspect or embodiment may also be used with any other aspect or embodiment.

BRIEF DESCRIPTION OF THE FIGURES

The various features and advantages of the disclosed examples will become apparent to those skilled in the art from the detailed description. The figures that accompany the detailed description can be briefly described as follows:

FIG. 2b illustrates a perspective view of the load distribution device of FIG. 2a.

FIG. 3 an exemplary mode of operation of the disclosure in connection with a side view of the load distribution device of FIG. 2a.

DETAILED DESCRIPTION

This disclosure relates generally to assemblies that can change how an impact load influences a vehicle battery.

Figure 1:
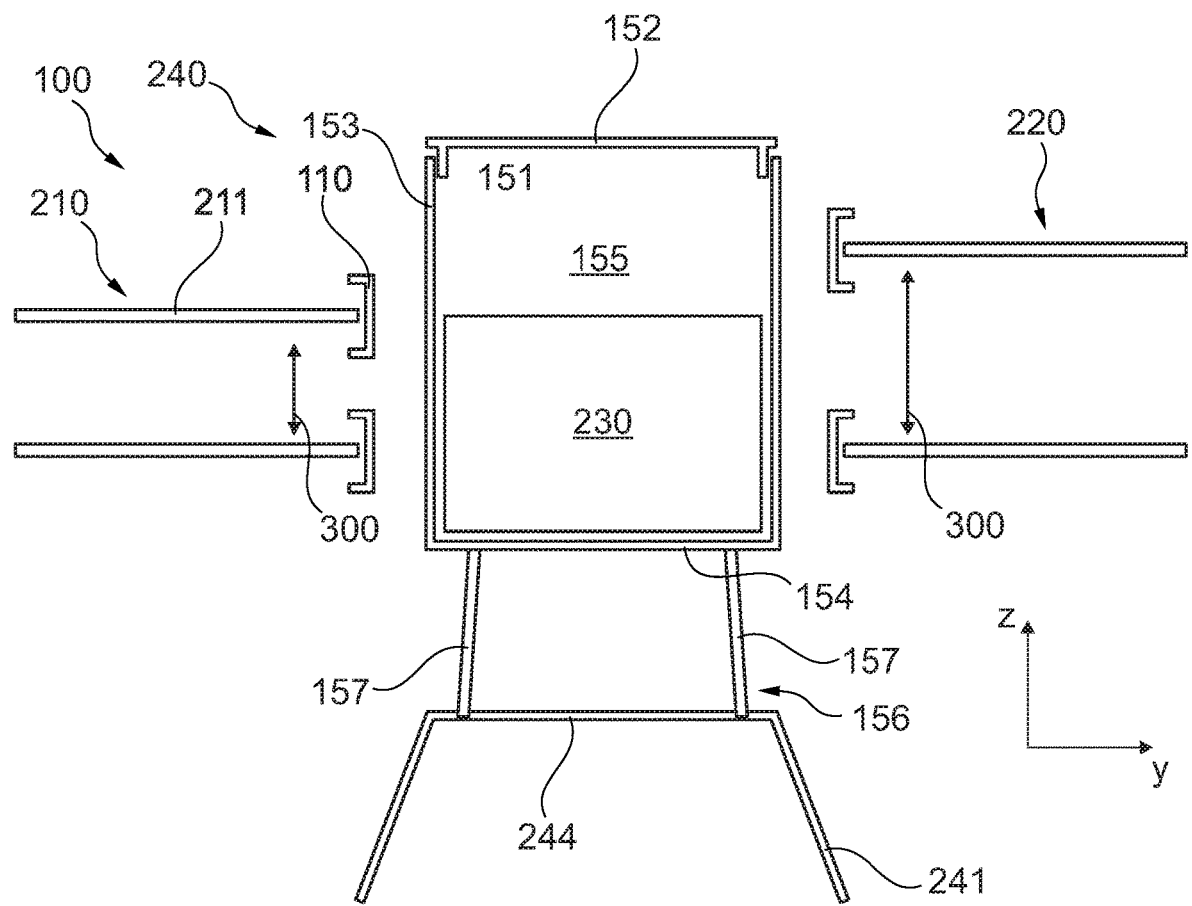
FIG. 1 illustrates a schematic front view of an exemplary embodiment of the present disclosure.

Referring to the schematic front view in FIG. 1, an exemplary assembly 100 is in the region of a center console 240, in other words between a first or left vehicle seat 210 and a second or right vehicle seat 220. The vehicle seats 210, 220 are each depicted in idealized form by a crossbar 211 which can perform a movement in a movement direction 300 along the z-axis represented by a double arrow and is portrayed for each vehicle seat 210, 220 by way of example in two different positions on the z-axis. A vehicle battery 230 of the hybrid motor vehicle is arranged in the region of the center console 240 and above the center tunnel 241 running below the center console.

For purposes of this disclosure, identical parts are provided with the same reference numbers in the different figures, which is why they are also usually described only once. In particular, the figures should be understood to mean that different components are depicted in a hidden or simplified form to provide greater clarity. Even if the vehicle battery is depicted in simplified form as a cuboid, it, or the housing or battery cage/protective cage surrounding it, may exhibit any suitable external shape and size. Insofar as a vehicle or hybrid vehicle is referred to below, a mild hybrid vehicle is also included.

Figure 2A:
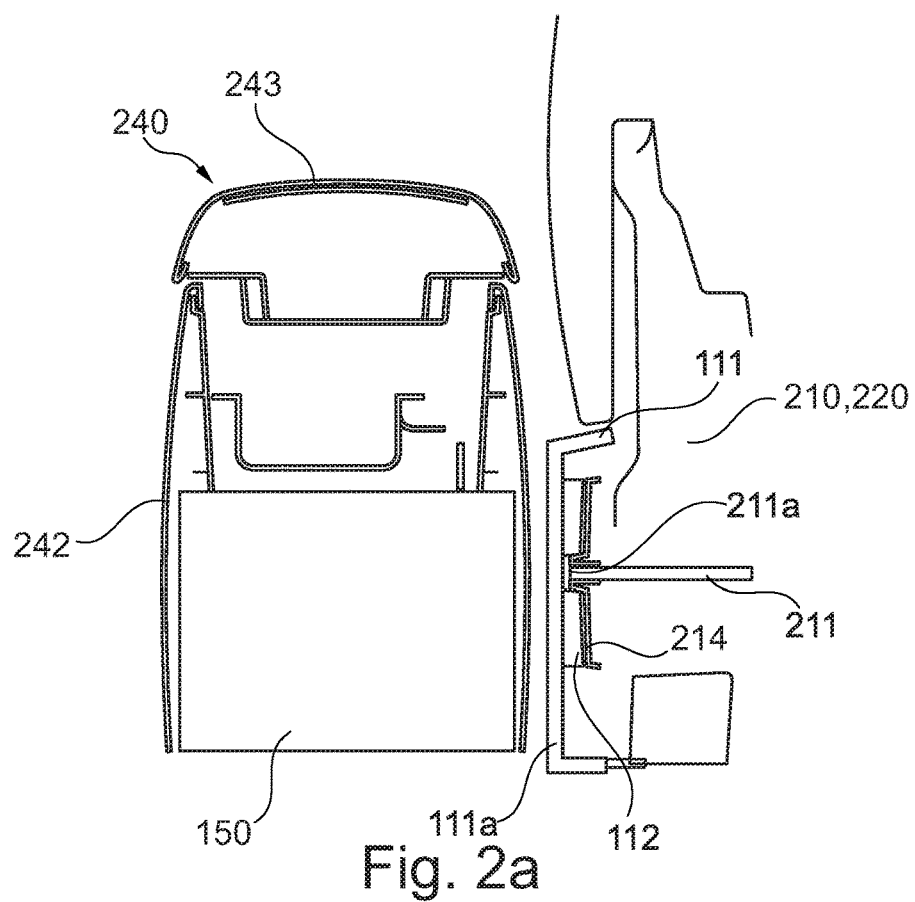
FIG. 2a illustrates a front view of a load distribution device according to an exemplary embodiment of this disclosure.

With reference to FIG. 2a and continuing reference to FIG. 1, the vehicle battery 230 is mounted in a battery tray 150 that can protect the vehicle battery 230 during a lateral impact involving the hybrid motor vehicle. The battery tray 150 can have the stiffness or stability sufficient to protect the vehicle battery 230 from unacceptable loading/deformation, which can be caused by an effect measuring up to 10 kN caused by a crossbar 211 of one of the adjacent vehicle seats 210, 220 during a lateral impact on the hybrid motor vehicle and the resulting deformation of the vehicle.

The battery tray 150 has an upwardly oriented opening 151 which allows simple insertion and removal of the vehicle battery 230. The geometric dimensions of the battery tray 150 or the vehicle battery 230 arranged therein are prescribed by the geometric dimensions of the center console 240, in particular by the distance between the adjacent vehicle seats 210, 220, and can be varied accordingly. Hence, the dimension of the battery tray 150 or the vehicle battery 230 arranged therein may be 140 mm, for example, in the y-direction.

The battery tray 150, in the exemplary embodiment, is fastened to the hybrid motor vehicle, in particular to the center tunnel 241, by means of a flexible fastening device 156. The flexibility of the fastening device 156 means that the battery tray 150 is movable relative to the center tunnel 241. In the event of a lateral impact, the battery tray 150 does not therefore form a rigid abutment for the crossbars 211 of the vehicle seats 210, 220 moving in the y-direction. Instead, the battery tray 150 follows the movement and thereby prevents a force effect on the vehicle battery 230 arranged in the inside 155 of the battery tray 150.

The fastening device 156 of the assembly 100 can comprise two connecting elements 157, for example, which connect a lower side 154 of the battery tray 150 to a center tunnel upper side 244 of the center tunnel 241 in each case, for fastening purposes. In addition, the battery tray 150 of the assembly 100 has a reinforcing cover 152 for closing the upwardly directed opening 151. The multi-part design of the battery tray 150 means that additional options exist for improving the stability of the battery tray 150 and reducing its weight.

A rigid crossbar 211 which extends over the entire width of the vehicle seat 210, 220 in the y-direction can represent the rotational axis of the seat back 215, for example, on which said seat back 215 can be pivoted for ergonomic adjustment to the vehicle passengers. In the event of an impact load, this crossbar 211 of the rotational axis may substantially exert a point force on the side walls 153 of the battery tray 150. The assembly 100 therefore has a load distribution device 110 which is arranged between the crossbar 211 and the battery tray 150. The load distribution device 110 distributes the point load of the crossbar 211 over a large area and is moved with the crossbar 211 during a manual or automatic adjustment of the vehicle seat 210, 220 in the x-direction and/or in the z-direction.

The front view in FIG. 2a shows the battery tray 150 which is arranged in, or in the region of, the center console 240. The battery tray 150 is upwardly surrounded by a cover 243 (which can also be referred to as an armrest) of the center console 240 and laterally by side walls 242 of the center console 240. The center tunnel upper side 244 of the center tunnel 240 is preferably arranged therebelow (see FIG. 1).

In the exemplary embodiment, a dimension of the battery tray 150 in the y-direction measures 140 mm, for example, and therefore corresponds virtually completely to the dimension of the center console 240 in the y-direction. The vehicle seat 210, 220 with the crossbar 211 is arranged to the left and right in the y-direction alongside the center console 240. At an end region 211a of the crossbar 211 facing the center console 240, a load distribution device 110 (see FIG. 1) is provided.

In the exemplary embodiment, the load distribution device 110 has a cover 111 which forms an abutment surface 111a for the striking of the crossbar 211 against the side walls 242 of the center console 240 or the battery tray 150 in the event of an impact load passing through the hybrid motor vehicle. The load distribution device 110 may, in addition, comprise a plate 112 between the cover 111 and the crossbar 211, which plate improves the process of the load distribution from the crossbar 211 to the cover 111 and increases the stability of the load distribution device 110. For this purpose, the plate 112 is coupled in a force-fitting and/or form-fitting manner to the seat back rotational device 214, the crossbar 211, and/or the cover 111. The plate 112 may also be configured with ribs, in particular reinforcing ribs, for this purpose. The plate 112 may therefore form a kind of bypass for the load from the crossbar 211 to the cover 111 when the hybrid motor vehicle is involved in a lateral impact and reduce the load peaks from 10 kN, for example, to load peaks of 5-6 kN, for example.

Figure 2B:
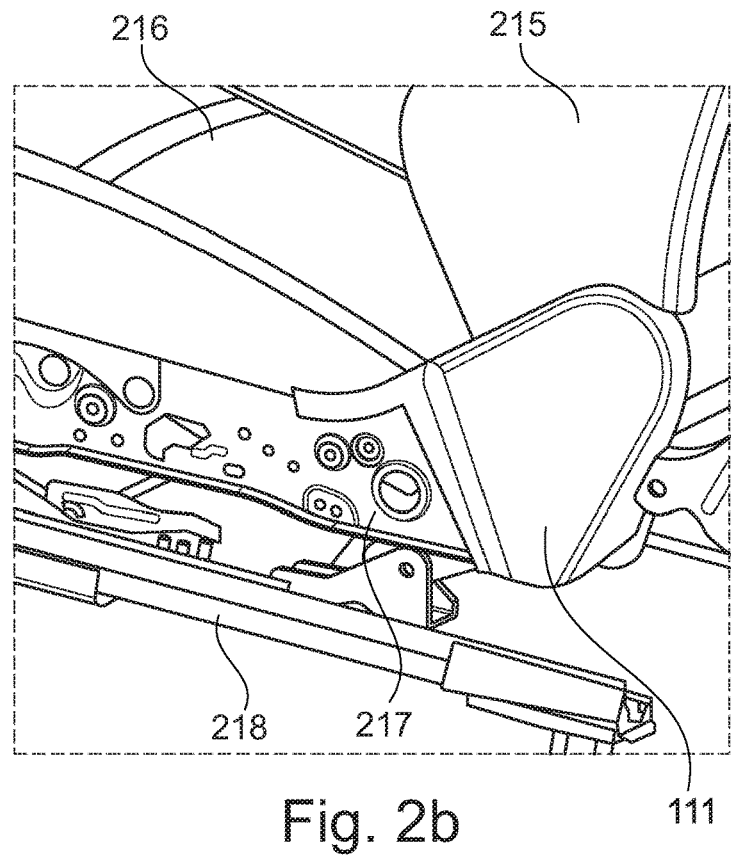

With reference to FIG. 2b, the original component of the protective cover may also be reused as the cover 111 for the load distribution device 110. The seat back rotational device 214 allows a rotation or pivoting of the seat back 215 relative to the seat surface 216 of the vehicle seats 210, 220.

In the exemplary embodiments, the vehicle seats 210, 220 include a substructure 217 and are therefore height-adjustable in the z-direction and displaceable along the seat rail 218 in the x-direction for adjustment to the ergonomic needs of the vehicle passengers.

Figure 3:
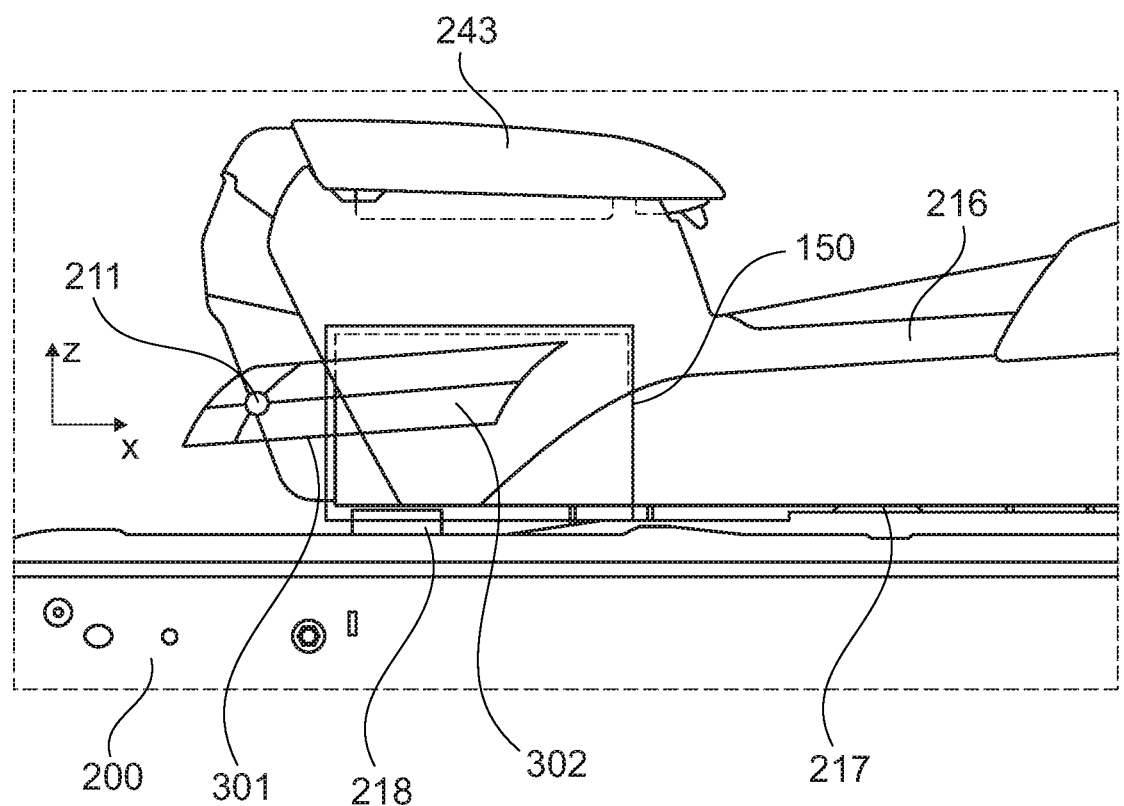

According to FIG. 3, the plurality of possible movements 300 (FIG. 1) in the x-direction and/or in the z-direction gives rise to a movement field 301 in which the crossbar 211 can remain during the running of the hybrid motor vehicle and, in the event of a lateral impact, can cause damage to the battery tray 150 in the region of the center console 240 and in an overlapping region 302 between the crossbar 211 and the battery tray 150.

A local or concentrated reinforcement is not therefore sufficient, since an impact of the crossbar 211 on the vehicle battery 230 can take place at various locations. In the present disclosure, the impact protection in the event of a lateral impact is therefore configured independently of the current position of the rotational axis of the seat back 215. By means of the battery tray 150, particularly in conjunction with the flexible mounting above the center tunnel 241, the vehicle battery 230 (FIG. 1) can be protected in its entire overlapping region 302 with the crossbar 211 in the event of an impact.

The load distribution device 110 can also move with the movement 300 of the crossbars 211 in the entire movement field 301, and therefore in the overlapping region 302 of the battery tray 150 or of the vehicle battery 230. The load distribution device 110 is therefore available to protect the vehicle battery 230, irrespective of the position of the crossbar 211, in the event of an impact. In this way, the vehicle battery 230 and also the vehicle passengers can be protected in the event of a lateral impact load being applied to the vehicle.

The teachings of this disclosure can also be used in a vehicle without a center tunnel where the vehicle battery is arranged between the two seats.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly that provides impact protection for a vehicle battery of a hybrid motor vehicle, comprising:
    at least a first vehicle seat;
    a second vehicle seat arranged adjacent to the first vehicle seat;
    a center console arranged between the first vehicle seat and the second vehicle seat;
    a center tunnel arranged below the center console and a vehicle battery; and
    a battery tray having an upwardly directed opening for receiving the vehicle battery, the battery tray arranged in a region of the center console between the first vehicle seat and the second vehicle seat; and
    at least one crossbar disposed in a transverse vehicle direction, and a load distribution device disposed between the at least one crossbar and the battery tray.

2. The assembly of claim 1, wherein the at least one crossbar is within the first vehicle seat, the second vehicle seat or both the first vehicle seat and the second vehicle seat.

3. The assembly of claim 2, wherein the crossbar is disposed along a rotational axis of a seat back.

4. The assembly of claim 1, wherein the load distribution device includes a cover arranged at an end portion of the crossbar facing the center console.

5. The assembly of claim 4, wherein the cover has an abutment surface that is oriented perpendicularly to the crossbar.

6. The assembly of claim 4, wherein the cover has a rib structure for reinforcing the cover.

7. The assembly of claim 4, wherein the load distribution device of the assembly has a plate and the plate is suitable for transmitting a load from the crossbar to the cover, the battery tray, or both the cover and the battery tray.

8. The assembly of claim 7, wherein the plate has a rib structure for reinforcing the plate.

9. A method of providing impact protection for a vehicle battery of a hybrid motor vehicle, comprising:
fastening a battery tray to a center tunnel of a hybrid motor vehicle using a flexible fastening device such that the battery tray is moveable relative to the center tunnel by means of the flexible fastening device, wherein the battery tray is arranged in a region of a center console of the hybrid motor vehicle between a first vehicle seat and a second vehicle seat of the hybrid motor vehicle; and
positioning a load distribution device between at least one crossbar of the first vehicle seat and the battery tray, the at least one crossbar disposed in a transverse vehicle direction.

10. The method of claim 9, further comprising receiving a vehicle battery through an upwardly directed opening of the battery tray.

11. The method of claim 9, wherein the battery tray is disposed above a center tunnel of the hybrid motor vehicle.

12. An assembly that provides impact protection for a vehicle battery of a hybrid motor vehicle, comprising:
at least a first vehicle seat;
a second vehicle seat arranged adjacent to the first vehicle seat;
a center console arranged between the first vehicle seat and the second vehicle seat;
a center tunnel arranged below the center console and a vehicle battery; and
a battery tray having an upwardly directed opening for receiving the vehicle battery, the battery tray arranged in a region of the center console between the first vehicle seat and the second vehicle seat; and
a load distribution device positioned between the first vehicle seat and the battery tray.

13. The assembly of claim 12, wherein the vehicle battery is a vehicle battery of a mild hybrid motor vehicle.

14. The assembly of claim 12, further comprising a flexible fastening device that fastens the battery tray to the hybrid motor vehicle such that the battery tray is moveable relative to the center tunnel by means of the flexible fastening device.

15. The assembly of claim 12, wherein the battery tray is arranged above the center tunnel.

16. The assembly of claim 14, wherein the flexible fastening device of the assembly includes at least one connecting element configured to fasten an underside of the battery tray to a center tunnel upper side of the center tunnel.

17. The assembly of claim 12, wherein the battery tray of the assembly has a stiffening cover for closing the upwardly directed opening.

18. The assembly of claim 12, further comprising a cover that removably attaches to the battery tray to close the upwardly directed opening.

* * * * *